United States Patent
Lindberg et al.

(10) Patent No.: US 12,326,122 B2
(45) Date of Patent: Jun. 10, 2025

(54) METHOD FOR DIAGNOSING A PART OF A POWERTRAIN SYSTEM

(71) Applicant: VOLVO TRUCK CORPORATION, Gothenburg (SE)

(72) Inventors: Johan Lindberg, Gothenburg (SE); Esteban Gelso, Gothenburg (SE); Claes Kuylenstierna, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/757,548

(22) PCT Filed: Dec. 20, 2019

(86) PCT No.: PCT/EP2019/086530
§ 371 (c)(1),
(2) Date: Oct. 19, 2022

(87) PCT Pub. No.: WO2021/121615
PCT Pub. Date: Jun. 24, 2021

(65) Prior Publication Data
US 2023/0011920 A1    Jan. 12, 2023

(51) Int. Cl.
*F02D 41/22*    (2006.01)
*F02D 13/02*    (2006.01)
(Continued)

(52) U.S. Cl.
CPC ....... *F02D 41/221* (2013.01); *F02D 13/0203* (2013.01); *F02D 13/0253* (2013.01);
(Continued)

(58) Field of Classification Search
CPC ............. F02D 13/0203; F02D 13/0253; F02D 41/0007; F02D 41/1454–1458;
(Continued)

(56) References Cited

U.S. PATENT DOCUMENTS 5,721,375 A * 2/1998 Bidner ................ F02D 41/0087
701/101
7,546,827 B1 * 6/2009 Wade ...................... F02D 13/06
123/324
(Continued)

FOREIGN PATENT DOCUMENTS

CN    103511107 A    1/2014
CN    108223156 A    6/2018
(Continued)

OTHER PUBLICATIONS

International Search Report and Written Opinion in corresponding International Application No. PCT/EP2019/086530 mailed Nov. 6, 2020 (20 pages).
(Continued)

*Primary Examiner* — John M Zaleskas
(74) *Attorney, Agent, or Firm* — Venable LLP; Jeffri A. Kaminski

(57) ABSTRACT

A method for diagnosing a part of a powertrain system is provided. The powertrain system comprising an internal combustion engine system having an internal combustion engine provided with a plurality of cylinders, each cylinder being provided with an air inlet valve and an exhaust gas valve, the method comprising the steps of operating any one of the inlet valve and the exhaust valve for any one of the cylinders to adjust the frequency and/or duration of air pulses during different load conditions of the internal combustion engine; determining an operational behaviour of the part of the powertrain system in response to the adjusted frequency and/or duration of the air pulses; and comparing the determined operational behaviour of the part of the powertrain system with an expected behaviour of the part of the powertrain system.

9 Claims, 3 Drawing Sheets

(51) Int. Cl.
*F02D 41/00* (2006.01)
*F02D 41/14* (2006.01)

(52) U.S. Cl.
CPC ..... *F02D 41/0007* (2013.01); *F02D 41/1454* (2013.01); *F02D 2041/001* (2013.01)

(58) Field of Classification Search
CPC .. F02D 41/146; F02D 41/1461; F02D 41/221; F02D 2041/001; F01L 2800/11
See application file for complete search history.

(56) References Cited

U.S. PATENT DOCUMENTS

| | | | | |
|---|---|---|---|---|
| 7,778,766 | B1* | 8/2010 | Cowgill | F02M 26/49 |
| | | | | 123/703 |
| 10,215,115 | B1* | 2/2019 | Ranga | F02D 41/0002 |
| 2002/0099495 | A1* | 7/2002 | Takagi | F02D 17/02 |
| | | | | 701/114 |
| 2003/0033997 | A1* | 2/2003 | Yoshiki | F02D 41/222 |
| | | | | 123/90.11 |
| 2003/0110845 | A1* | 6/2003 | Kumagai | F02D 41/221 |
| | | | | 73/114.74 |
| 2003/0221664 | A1* | 12/2003 | Surnilla | F02P 5/1512 |
| | | | | 123/339.11 |
| 2005/0044934 | A1* | 3/2005 | Weiss | F01L 13/0015 |
| | | | | 73/114.79 |
| 2005/0199220 | A1* | 9/2005 | Ogiso | F02D 41/0087 |
| | | | | 123/90.11 |
| 2006/0243040 | A1* | 11/2006 | Reed | F01L 9/20 |
| | | | | 73/114.79 |
| 2006/0293832 | A1* | 12/2006 | Schwarzenthal | F02D 13/0211 |
| | | | | 701/114 |
| 2009/0045629 | A1* | 2/2009 | Vuk | F02G 5/02 |
| | | | | 60/611 |
| 2009/0066337 | A1* | 3/2009 | Gibson | F01L 1/34 |
| | | | | 324/378 |
| 2009/0198432 | A1* | 8/2009 | Tabata | F02D 23/02 |
| | | | | 701/103 |
| 2009/0199628 | A1* | 8/2009 | Hartmann | F02D 13/02 |
| | | | | 73/114.79 |
| 2009/0217661 | A1* | 9/2009 | Gruel | F02B 37/186 |
| | | | | 60/602 |
| 2009/0229356 | A1* | 9/2009 | Kariya | F02D 41/1463 |
| | | | | 73/114.73 |
| 2010/0031738 | A1* | 2/2010 | Feldkamp | G01M 15/042 |
| | | | | 73/114.79 |
| 2010/0154738 | A1* | 6/2010 | Tsukamoto | F02D 17/04 |
| | | | | 73/114.31 |
| 2010/0175462 | A1* | 7/2010 | Doering | F02D 13/06 |
| | | | | 701/112 |
| 2010/0175463 | A1* | 7/2010 | Doering | F02D 41/221 |
| | | | | 73/114.37 |
| 2010/0288037 | A1* | 11/2010 | Gibson | F01L 13/0005 |
| | | | | 73/114.79 |
| 2011/0137509 | A1* | 6/2011 | Sarac | F02D 41/221 |
| | | | | 73/114.37 |
| 2011/0144888 | A1* | 6/2011 | Rollinger | F02D 41/221 |
| | | | | 701/103 |
| 2012/0173122 | A1* | 7/2012 | Nishikiori | F02D 41/0087 |
| | | | | 701/103 |
| 2013/0013165 | A1* | 1/2013 | Doering | F01L 13/00 |
| | | | | 701/101 |
| 2013/0239917 | A1* | 9/2013 | Nishikiori | F02D 13/00 |
| | | | | 123/90.1 |
| 2013/0304352 | A1* | 11/2013 | Macfarlane | F01L 9/14 |
| | | | | 701/99 |
| 2014/0000557 | A1* | 1/2014 | Glugla | F02D 41/008 |
| | | | | 123/434 |
| 2014/0039776 | A1* | 2/2014 | Cowgill | F02D 13/0249 |
| | | | | 701/102 |
| 2014/0123940 | A1* | 5/2014 | Varney | F02D 41/0082 |
| | | | | 123/347 |
| 2014/0202425 | A1* | 7/2014 | Varney | F02D 13/02 |
| | | | | 123/347 |
| 2014/0261309 | A1* | 9/2014 | Chen | F02D 37/02 |
| | | | | 123/320 |
| 2015/0233289 | A1* | 8/2015 | Younkins | F02D 35/023 |
| | | | | 73/114.79 |
| 2016/0061127 | A1* | 3/2016 | Chen | F02D 41/0087 |
| | | | | 123/481 |
| 2016/0356196 | A1* | 12/2016 | Nakano | F01N 9/00 |
| 2017/0101956 | A1* | 4/2017 | Younkins | F02D 41/1401 |
| 2017/0107924 | A1* | 4/2017 | Blythe | F02D 41/0065 |
| 2017/0130664 | A1* | 5/2017 | Rueger | F02D 41/222 |
| 2017/0299466 | A1* | 10/2017 | Chen | F02M 35/1038 |
| 2017/0356362 | A1* | 12/2017 | Macewen | F02D 41/009 |
| 2017/0356374 | A1* | 12/2017 | Rollinger | F02D 17/02 |
| 2017/0370804 | A1* | 12/2017 | Chen | G01M 15/11 |
| 2018/0135541 | A1 | 5/2018 | Hsieh et al. | |
| 2018/0156151 | A1* | 6/2018 | Esposito | F02D 41/221 |
| 2018/0156692 | A1* | 6/2018 | Chen | F02D 41/0087 |
| 2018/0163643 | A1* | 6/2018 | Kim | F02D 41/0055 |
| 2018/0274471 | A1* | 9/2018 | Dudar | G01M 15/042 |
| 2019/0033170 | A1* | 1/2019 | Dudar | G01M 15/106 |
| 2019/0211768 | A1* | 7/2019 | Dudar | F02D 41/18 |
| 2019/0271265 | A1* | 9/2019 | Iannone | F02B 31/02 |
| 2020/0141835 | A1* | 5/2020 | Dudar | F02D 41/1445 |
| 2020/0191075 | A1* | 6/2020 | Szczepanski | F02D 13/06 |
| 2020/0191076 | A1* | 6/2020 | Szczepanski | F02D 41/1441 |
| 2020/0309051 | A1* | 10/2020 | Kelly | F02D 41/1497 |
| 2020/0347757 | A1* | 11/2020 | Lundgren | F01L 9/16 |
| 2021/0003087 | A1* | 1/2021 | Spearrin | F02B 77/085 |
| 2021/0293197 | A1* | 9/2021 | Storm | F02D 41/0087 |
| 2021/0388776 | A1* | 12/2021 | Eriksson | F02D 23/00 |
| 2022/0170423 | A1* | 6/2022 | Spearrin | F02D 13/0253 |
| 2022/0275766 | A1* | 9/2022 | Braun | F02D 13/06 |
| 2023/0383705 | A1* | 11/2023 | Spearrin | F02D 15/02 |

FOREIGN PATENT DOCUMENTS

| | | | |
|---|---|---|---|
| EP | 1460254 | A1 | 9/2004 |
| JP | 2009203880 | A * | 9/2009 |
| WO | 2019152886 | A2 | 8/2019 |
| WO | 2019152886 | A3 | 4/2020 |

OTHER PUBLICATIONS

Second Written Opinion of the International Preliminary Examining Authority in corresponding International Application No. PCT/EP2019/086530 mailed Nov. 12, 2021 (7 pages).

International Preliminary Report on Patentability in corresponding International Application No. PCT/EP2019/086530 mailed Jan. 24, 2022 (12 pages).

European Communication pursuant to Article 94(3) EPC dated Apr. 25, 2024 in corresponding European Patent Application No. 19835288.2, 9 pages.

Chinese Office Action dated Apr. 1, 2024 in corresponding Chinese Patent Application No. 201980103085.7, 18 pages.

Chinese Office Action dated Sep. 28, 2024 in corresponding Chinese Patent Application No. 201980103085.7, 13 pages.

* cited by examiner

METHOD FOR DIAGNOSING A PART OF A POWERTRAIN SYSTEM

CROSS-REFERENCE TO RELATED APPLICATIONS

This application is a U.S. National Stage application of PCT/EP2019/086530, filed Dec. 20, 2019 and published on Jun. 24, 2021, as WO 2021/121615, all of which is hereby incorporated by reference in its entirety.

TECHNICAL FIELD

The present disclosure relates to a method for diagnosing a part of a powertrain system. The method is particularly applicable for powertrain systems of vehicles comprising internal combustion engine systems. Although the method will mainly be described in relation to a truck, it may also be applicable for other types of vehicles propelled by means of an internal combustion engine. In particular, the present disclosure can be applied in heavy-duty vehicles, such as trucks, buses and construction equipment. The present disclosure also relates to a corresponding control unit for performing the method, as well as a vehicle comprising such a control unit.

BACKGROUND

There is a general desire for improving internal engine combustion systems with regard to performance, efficiency, exhaust gas aftertreatment, etc. In addition, present regulatory conditions in the field of heavy-duty vehicles have led to an increasing demand for improving fuel economy and reducing emissions in present vehicles. In this context, the components making up the internal combustion engine system may need to be improved in several different manners. However, there is also an increasing demand for monitoring the operations of the components of the internal combustion engine system. By way of example, a control unit of the vehicle may perform one or several types of diagnosis of the internal combustion engine system, e.g. by tracking deviations in performance of one or more components.

Various ways of diagnosing degradation of engine components or identifying faulty engine components have been proposed. US 2017/0107924 A1 discloses one example of adjusting engine operation and diagnosing individual cylinders of an engine system based on speed fluctuations of a turbocharger of the engine system.

Despite the activity in the field of diagnosing a powertrain system and its components, there remains an increasing need for further improvements, which is partly due to the development and introduction of new types of components and new types of internal combustion engine systems. Generally, an introduction of new types of components into an internal combustion engine system may often have an impact on the current diagnosis tests or may even require that some engine components are monitored in other ways based on other types of operational parameters.

SUMMARY

An object of the disclosure is to provide an improved method for performing a diagnosis of a part of a powertrain system, which method provides for a simple, yet flexible, diagnosing routine that can be performed on several different types of powertrain system components. This object is achieved by a method according to claim 1.

According to a first aspect of the disclosure, the object is achieved by a method for diagnosing a part of a powertrain system. The powertrain system comprises an internal combustion engine system having an internal combustion engine provided with a plurality of cylinders. Each cylinder is provided with an air inlet valve and an exhaust gas valve.

The method comprises the steps of:
operating any one of the inlet valve and the exhaust valve for any one of the cylinders to adjust the frequency and/or duration of air pulses during different load conditions of the internal combustion engine;
determining an operational behaviour of the part of the powertrain system in response to the adjusted frequency and/or duration of the air pulses; and
comparing the determined operational behaviour of the part of the powertrain system with an expected behaviour of the part of the powertrain system.

In this manner, it becomes possible to perform a diagnosis of one or several components of the powertrain system by operating the valves in a certain manner. In particular, the method provides for monitoring deviations in transient behaviour by introducing disturbance injections in the form of air pulses into the air-path system, i.e. the air-path circuit, of the powertrain system, and further comparing the operational behaviour of the system with an expected operational behaviour of the system. To this end, the method allows for determining the operational impact on the part of the powertrain system in response to the adjusted frequency and/or duration of the air pulses during different load conditions.

The example embodiments of the present disclosure are particular useful for an internal combustion engine system having a fully variable valve actuation (VVA) system, in which the valves can be freely operated so as to adjust the frequency and/or duration of air pulses during different load conditions of the internal combustion engine.

As will be further described herein, the diagnosing routine according to the example embodiments may be performed on several different types of powertrain system components. According to one example embodiment, the method may be used for diagnosing variations in turbocharger performance. According to one example embodiment, the method may be used for diagnosing oxygen fraction in the exhaust gases from the internal combustion engine by means of a so-called NOx sensor arranged in an exhaust manifold and/or in an exhaust aftertreatment system (EATS).

The example embodiments may also provide for explaining unexpected engine and/or turbocharger arrangement behaviours and predicting future system behaviour. Such information may also be valuable for future engine and general powertrain system development work.

By the provision of adjusting the frequency and/or duration of air pulses during different load conditions of the internal combustion engine, the method is configured to adjust the flow of air in the air path system of the powertrain system. While it may be sufficient to operate only one valve of one cylinder in the step of operating any one of the inlet valve and the exhaust valve for any one of the cylinders to adjust the frequency and/or duration of air pulses during different load conditions of the internal combustion engine, it may be more advantageous to operate at least one valve for each one of the cylinders to adjust the frequency and/or duration of air pulses during different load conditions of the internal combustion engine.

Typically, although not strictly required, the step of adjusting the frequency and/or duration of air pulses during different load conditions of the internal combustion engine may comprise the step of adding additional air pulses in the air path system of the powertrain system. That is, the step of adjusting the frequency and/or duration of air pulses during different load conditions of the internal combustion engine generally comprises the step of adding additional air pulses in the air path system of the powertrain system in addition to the prevailing supplied air pulses in the air path system of the powertrain system.

In addition, or alternatively, the step of adjusting the frequency and/or duration of air pulses during different load conditions of the internal combustion engine may comprise the step of adjusting the duration, i.e. extension, of the prevailing supplied air pulses in the air path system of the powertrain system and adding additional air pulses in the air path system of the powertrain system in addition to the prevailing supplied air pulses in the air path system of the powertrain system. In other example embodiments, the step of adjusting the frequency and/or duration of air pulses during different load conditions of the internal combustion engine may comprise the step of adjusting only the duration, i.e. extension, of the prevailing supplied air pulses in the air path system of the powertrain system.

The provision of operating any one of the inlet valve and the exhaust valve for any one of the cylinders to adjust the frequency and/or duration of air pulses during different load conditions of the internal combustion engine is at least partly based on the possibility of introducing disturbance in the air-path(s) of the powertrain system and/or internal combustion system. By controlling the valves to adjust the frequency and/or duration of air pulses and/or add additional air pulses through e.g. the turbocharger arrangement, the impact from such changes in the air-path management can be compared with a normal behaviour of the turbocharger arrangement. The frequency and/or duration of air pulses and/or add additional air pulses can be performed in several different manners, e.g. by changing the level of valve lift and/or adjusting timing of valve opening or closing for one or more cylinders of the engine.

There are various ways of controlling the valves to adjust the frequency and/or duration of air pulses during different load conditions of the powertrain system, including, but no limited to, the internal combustion engine and the turbocharger arrangement, in particular for a cam-less engine provided with a fully variable valve actuation (VVA) arrangement.

A fully variable valve actuation system may be operated by electro-magnetic or electro-hydraulic, electro-hydraulic-pneumatic, electro-hydraulic-pneumatic, electro-pneumatic, pneumatic or hydraulic actuators. Further, a VVA system may constitute a variable camshaft or a VVA system with individual valve actuation. By way of example, and as further described herein, a VVA system may typically comprise at least one flow control valve assembly for regulating the flow of fluid medium passing through the valve.

A VVA system is suitable for performing the diagnosis due to its versatility for different operating parameters. That is, a fully variable VVA system, where the valve timing, i.e. opening and closure of the intake valves, may be controlled individually for each valve and hence each cylinder allows for performing an improved diagnosis of a given part or component of the powertrain system. Hence, a VVA system will provide for increased flexibility in performing the method according to the example embodiments.

In particular, by means of using a VVA system, it becomes possible to operate any one of the inlet and exhaust valves in order to change the frequency and/or duration of the air pulses, e.g. by inducing additional air pulses in addition to the normal operation of the valves, so as to estimate the current behaviour of the air-path system of the powertrain system. Subsequently, the method performs a comparison between the current behaviour and expected behaviour with respect to the air pulses during different load conditions so as to provide an accurate diagnosis of the performance of one or more components making up the powertrain system.

In addition, different cylinders may be controlled in different ways and reduced valve lift, i.e. one or both valves are lifted/opened to a smaller degree than during normal operation of the engine, can be combined with adjusted timing of valve opening or closing. In this context, the step of adjusting the frequency and/or duration of air pulses during different load conditions typically depends on the prevailing control of the valves during normal operation of the engine. The frequency of the air pulses may e.g. be adjusted by opening and closing one of the inlet valve and the exhaust valve with another timing than the other one of the inlet valve and the exhaust valve. However, the frequency of the air pulses may also be adjusted in other ways in order to adjust the frequency of air pulses through the air path system of the internal combustion engine system, e.g. by opening the exhaust valve two times in a row during a load condition of the internal combustion engine.

When the frequency and/or duration of air pulses during different load conditions has been adjusted to a sufficient level for the particular application and situation, one may perform the two steps of determining an operational behaviour of the part of the powertrain system in response to the adjusted frequency and/or duration of the air pulses and comparing the determined operational behaviour of the part of the powertrain system with an expected behaviour of the part of the powertrain system.

That the determined operational behaviour of the part of the powertrain system is different to an expected behaviour of the part of the powertrain system means that there is a deviation in the operational performance of the part of the powertrain system compared to the expected operational performance of the part. A deviation in an operational behaviour may e.g. refer to a deviation in turbo speed, a deviation in oxygen fraction etc. as further described herein.

In the context of the disclosure, the term "load conditions", as used herein, typically refers to different engine speeds and/or different engine torques. Further, a load condition may refer to an idling state of the engine as well as a steady state load of the engine. In this example, the frequency and/or duration of air pulses may be adjusted during the idling state of the engine and during a steady state load of the engine.

According to one example embodiment, the powertrain system further comprises a turbocharger arrangement having a turbine for receiving exhaust gases from the internal combustion engine and a compressor for compressing intake air and feeding the intake air via an air intake line to the internal combustion engine.

Further, the turbine may be configured to convert exhaust gases into mechanical energy to drive the compressor. In this example embodiment, the step of determining an operational behaviour of the part of the powertrain system in response to the adjusted frequency and/or duration of the air pulses typically corresponds to determining the turbo speed of the turbocharger arrangement in response to the adjusted frequency and/or duration of the air pulses; and the step of comparing the determined operational behaviour of the part of the powertrain system with an expected behaviour of the part of the powertrain system typically corresponds to comparing the determined turbo speed of the turbocharger arrangement with an expected turbo speed of the turbocharger arrangement.

The above arrangement is at partly possible due to that the turbocharger arrangement is operated by gases from the exhaust manifold acting on the turbocharger turbine. That is, the turbocharger system is fluidly connected to the exhaust manifold of the combustion engine. Further, the turbocharger is arranged to drive the compressor which provides the intake air pressure. In other words, an adjustment in the frequency and/or duration of the air pulses may generally have a direct impact on the operation of the turbocharger.

The frequency and/or duration of the air pulses is controlled by means of the VVA system. At least one sensor may be used to detect impact of the adjusted frequency and/or duration of air pulses on the turbocharger, e.g. by detecting impact on injected pressurized gas on the turbocharger turbine and to collect data related thereto. The data collected is subsequently evaluated whereby an operational response of the turbocharger turbine can be determined. The operational response may e.g. be that the turbocharger is affected or not is affected by the injected pulse and/or may relate to the degree of response of the turbocharger turbine. It is possible to measure impact on the turbocharger turbine at various positions of the turbocharger system or at various positions being fluidly connected to the turbocharger turbine of the engine. Thus, it is not necessary that the data collected for evaluating the response of the turbocharger turbine is derived from a sensor which directly detects e.g. movements of the turbocharger turbine, such as e.g. a turbo speed sensor. The data may also be derived from a sensor which is configured to collect data for a parameter that indirectly affects or is affected by movement of the turbocharger turbine, such as e.g. a boost pressure sensor or a mass flow sensor. Such indirect sensor data may be correlated to the turbocharger turbine response by means of previously performed mapping or predetermined threshold values. Such correlation may e.g. be performed by the control unit.

According to one example embodiment, the powertrain system further comprises a NOx sensor disposed in an exhaust passage downstream the internal combustion engine. In this example embodiment, the step of determining an operational behaviour of the part of the powertrain system in response to the adjusted frequency and/or duration of the air pulses typically corresponds to determining the oxygen fraction in the exhaust gases by the NOx sensor in response to the adjusted frequency and/or duration of the air pulses; and the step of comparing the determined current operational behaviour of the part of the powertrain system with an expected behaviour of the part of the powertrain system typically corresponds to comparing the determined oxygen fraction with an expected oxygen fraction.

In this context, the exhaust passage typically refers to the exhaust manifold arranged downstream of the internal combustion engine. In particular, if the powertrain system includes the turbocharger arrangement, the NOx sensor is disposed in the exhaust passage downstream the turbocharger arrangement. By way of example, the NOx sensor may be arranged to collect data that can be associated to the operation of the exhaust aftertreatment system. As will be disclosed in more detail in the following description, the sensor may be at least one sensor of a number of possible types of sensors or a combination of different sensors. By way of example, the NOx sensor may be any one of an exhaust manifold pressure sensor, a mass flow sensor and an oxygen sensor. Such sensors are commonly used within the field of internal combustion engine systems.

According to one example embodiment, the method further comprises the step of selecting a part of the powertrain system to be diagnosed. As mentioned herein, the term "part", as used in relation to this expression, may refer to a component, such as the turbocharger arrangement, to a condition of a component, such as the oxygen fraction, and any other type of part and component of the powertrain system.

By way of example, the step of comparing the determined operational behaviour of the part of the powertrain system with an expected behaviour of the part of the powertrain system is performed by gathering operational data collected after the frequency and/or duration of the air pulses has been adjusted and comparing the operational data to operational data collected before the frequency and/or duration of the air pulses is adjusted. Such data may be gathered by a suitable sensor, as mentioned above. Hence, according to one example embodiment, the step of comparing the determined operational behaviour of the part of the powertrain system with an expected behaviour of the part of the powertrain system further comprises the step of comparing data collected after the frequency and/or duration has been adjusted to data collected before the frequency and/or duration is adjusted.

As mentioned above, the internal engine combustion system typically comprises a fully variable valve actuation (VVA) system. By way of example, the fully variable valve actuation (VVA) system comprises a flow control valve assembly adapted to regulate the flow of a fluid medium passing through the flow control valve. This means that the valves are not controlled by cams of a camshaft but are configured to be controllable by electronic, pneumatic and/or hydraulic means.

According to one example embodiment, the internal combustion engine system comprises at least one cylinder having a combustion chamber and a number of exhaust valve in fluid communication with the combustion chamber and configured to regulate the evacuation of exhaust gases from the combustion chamber. Typically, any one of the exhaust valves may comprise a flow control valve assembly adapted to regulate the flow of a fluid medium passing through the flow control valve.

According to one example embodiment, the internal combustion engine system comprises at least one cylinder having a combustion chamber and a number of inlet valves in fluid communication with the combustion chamber and configured to regulate the injection of air to the combustion chamber. Typically, any one of the inlet valves comprises a flow control valve assembly adapted to regulate the flow of a fluid medium passing through the flow control valve.

According to one example embodiment, the method comprises the step of determining if the determined operational behaviour differs from the expected operational behaviour by a threshold value indicative of a critical deviation in the operational behaviour. In this context, a critical deviation may refer to a deviation in an operational condition of the part of the powertrain system of such magnitude that the part and/or the powertrain system should undergo service and maintenance. Since the operational behaviour may differ for different types of vehicle, the step of determining whether the determined operational behaviour differs from the expected operational behaviour by more than a threshold value indicative of a critical deviation in the operational behaviour may be adjusted for a particular application and situation. Such a threshold may depend on the type of engine etc. but also on engine speed, vehicle velocity, etc. However, a particular deviation in the operational behaviour may not necessarily be required in order to determine that there is deviation in performance of the diagnosed part of the powertrain system.

The method according to the example embodiments may be performed e.g. at vehicle start up, i.e. when the combustion engine is ignited or when the power in the vehicle is turned on, at predetermined points in time such as e.g. once every day or once every week, or at predetermined time intervals during operation of the vehicle such as e.g. hourly or every ten minutes.

According to one example embodiment, the method steps are performed by a control unit. The control unit may be a single control unit, or a number of control units interconnected and collaborating in a distributed network forming a distributed control unit.

According to a second aspect of the present disclosure, there is provided a control unit for diagnosing a part of a powertrains system. The control unit is configured to perform any one of the steps of the method according to any one of the example embodiments and/or the features as described above in relation to the first aspect of the present disclosure.

Effects and features of the second aspect are largely analogous to those described above in relation to the first aspect of the present disclosure.

It should be noted that the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

As mentioned above, the control unit may be a digital control unit; however, the control unit may also be an analogue control unit.

Typically, the control unit may be configured to control the VVA system of the powertrain system. In addition, the control unit may be configured to control each one of the inlet and exhaust valves; in particular the control unit may be configured to control each one of the flow control valve assemblies of the powertrain system.

By way of example, the control unit is configured to operate an exhaust flow control valve assembly. That is, the control unit is configured to control an actuator to operate the exhaust flow control valve assembly. By way of example, the control unit is configured to operate the inlet flow control valve assembly. That is, the control unit is configured to control an actuator to operate the inlet flow control valve assembly.

The control unit may be arranged in the powertrain system, in the internal combustion engine system or in another remote location of the vehicle. Thus, the vehicle comprises the control unit.

According to a third aspect of the present disclosure, there is provided a vehicle comprising a powertrain system and a control unit as described above in relation to the second aspect of the present disclosure.

The vehicle typically comprises the powertrain system, the internal combustion engine system and the internal combustion engine. The engine typically comprises at least one cylinder at least partly defining a combustion chamber. Further, the engine comprises a reciprocating piston operable between the bottom dead centre and the top dead centre in the cylinder. The piston is generally connected to a crankshaft housed in a crankcase. Thus, the connecting rod connects the piston to the crankshaft. As the engine typically comprises a number of cylinders, each one of the cylinders also includes any one of the above features relating to the piston, combustion chamber and connecting rod. Moreover, the vehicle generally comprises a turbocharger arrangement.

According to a fourth aspect of the present disclosure, there is provided a computer program comprising program code means for performing the steps described above in relation to the first aspect of the present disclosure when the program is run on a computer.

According to a fifth aspect of the present disclosure, there is provided a computer readable medium carrying a computer program comprising program means for performing the steps described above in relation to the first aspect of the present disclosure when the program means is run on a computer.

Effects and features of the third, fourth and fifth aspects are largely analogous to those described above in relation to the first aspect of the present disclosure.

Further advantages and advantageous features of the disclosure are disclosed in the following description and in the dependent claims. The skilled person will realize that different features may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

Figure 1:
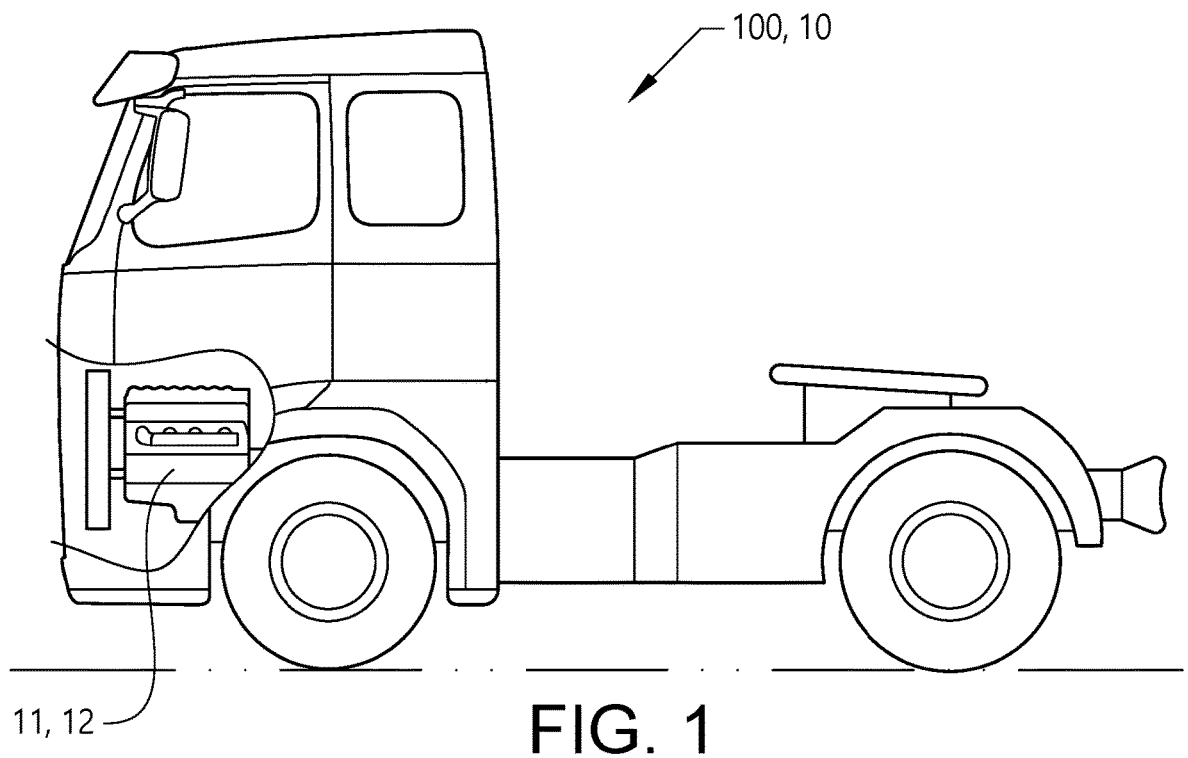
FIG. 1 shows a vehicle provided with an internal combustion engine system configured to be operated according to this disclosure.

With reference to the appended drawings, below follows a more detailed description of the embodiments of the disclosure cited as examples.

DETAILED DESCRIPTION OF EXAMPLE EMBODIMENTS OF THE DISCLOSURE

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference character refer to like elements throughout the description.

FIG. 1 illustrates a vehicle in the form of a truck 100. The vehicle comprises a powertrain system 10. The powertrain system comprises an internal combustion engine system 11. Moreover, the internal combustion engine system 11 includes an internal combustion engine (ICE) 12. In this example, the ICE is a diesel piston engine.

Figure 2:
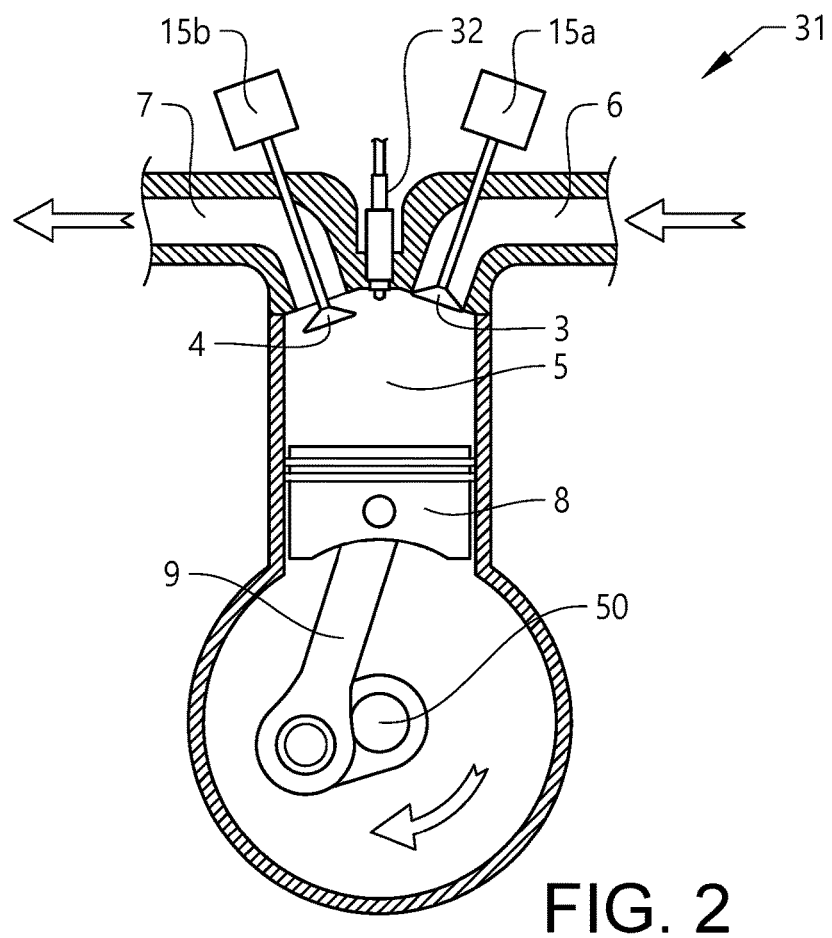
FIG. 2 shows a schematic view of a number of components of the internal combustion engine according to FIG. 1.

FIG. 2 shows a schematic view of a first cylinder 31 forming part of the internal combustion engine according to FIG. 1. The first cylinder 31 is provided with an inlet valve 3 and an exhaust valve 4 for controlling communication between a combustion chamber 5 in the cylinder 31 and an inlet duct 6 and an exhaust duct 7, respectively. A piston 8 is connected via a connection rod 9 to a rotatable crankshaft 50 and is configured to move in a reciprocating manner in the first cylinder 31 between a top dead centre position (TDC) close to the inlet and exhaust valves 3, 4 (i.e. an upper end position in FIG. 2) and a bottom dead centre position (BDC) away from the valves 3, 4 (i.e. a lower end position in FIG. 2).

Further, the cylinder 31 is provided with a valve actuation arrangement 15a, 15b configured to control opening and closing of the inlet and exhaust valves 3, 4. In this example, the valve actuation arrangement 15a, 15b is a fully variable valve actuation arrangement configured to be controllable by electronic means. That is, the ICE 12 is in this case a so-called cam-less engine where timing and lifting of the valves is not activated by, nor dependent on, any camshaft but can instead be freely controlled by the fully variable valve actuation arrangement. It should be readily appreciated that each cylinder is typically provided with an air inlet valve 3 and an exhaust gas valve 4. Analogously, it should be readily appreciated that each cylinder is also typically provided with a corresponding valve actuation arrangement for controlling corresponding air inlet valve 3 and exhaust gas valve 4.

FIG. 2 also indicates that the cylinder 31 is provided with a fuel supply system 32 for supplying fuel, such as diesel, to the first cylinder 31.

Figure 3:
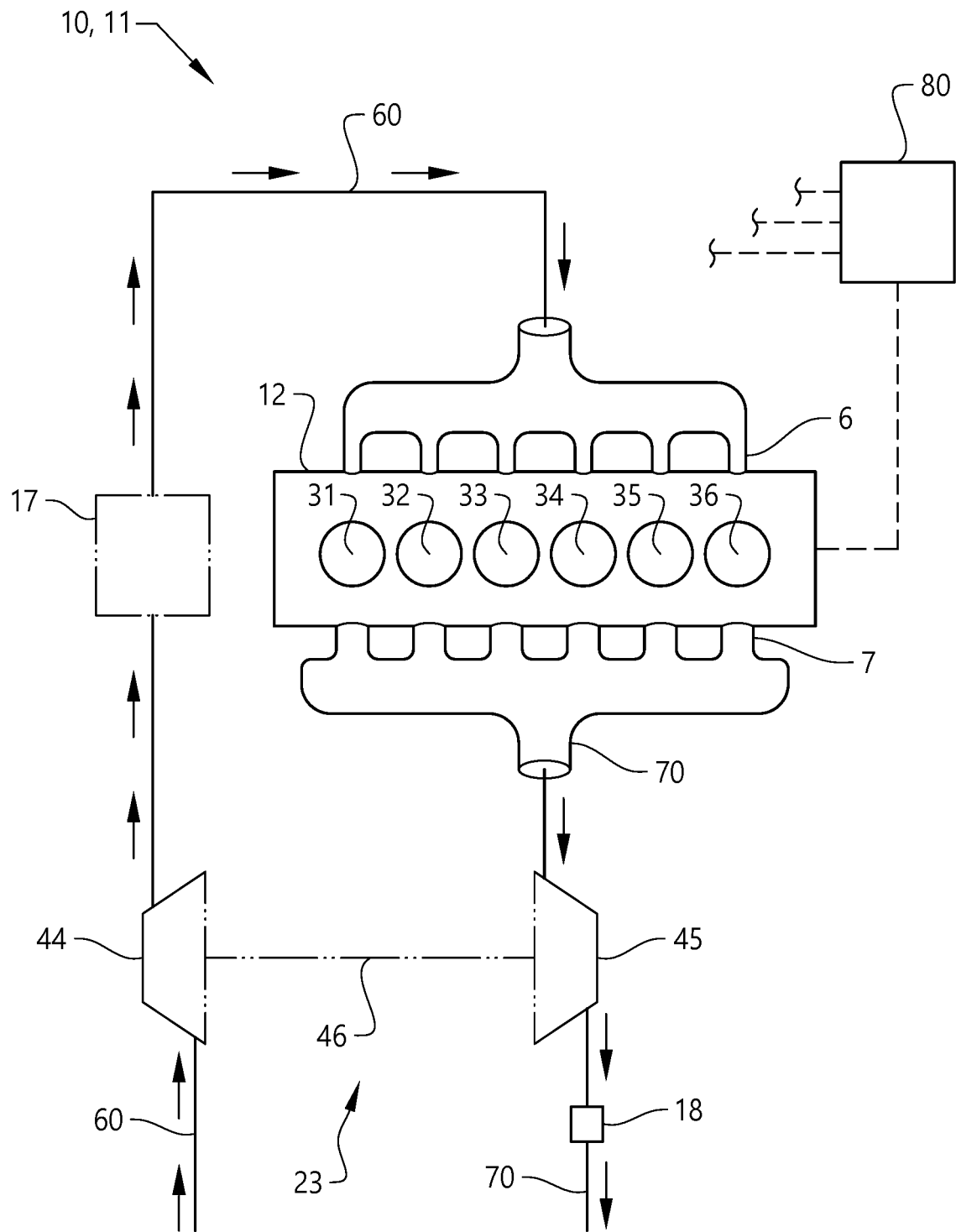
FIG. 3 shows a schematic view of the internal combustion engine system according to FIG. 1.

FIG. 3 shows a schematic view of the ICE system 11 according to FIG. 1. In this example, the ICE 12 is provided with six identical cylinders 31 to 36 all being arranged as shown in FIG. 2. In FIG. 3 it has been indicated in dashed lines that the ICE 12 may be provided with a turbocharging arrangement 23 comprising a turbocharger compressor 44 and a turbine 45 connected via shaft 46. A turbocharger generally comprises the turbocharger turbine and the turbocharger compressor connected to each other by the turbine shaft. The combustion engine has an exhaust manifold (typically corresponding to the main exhaust duct 70 in FIG. 3) and the turbocharger turbine is operable by exhaust gases from the exhaust manifold. During operation of the combustion engine exhaust gases from the exhaust manifold drives the turbocharger turbine, whereby the turbocharger turbine drives the turbocharger compressor via the turbine shaft. Upon activation of the turbocharger, the turbocharger compressor supplies additional air from the air intake of the combustion engine whereby more fuel can be combusted, and the combustion engine can deliver more power. Also, an optional charge air cooler 17 is indicated in FIG. 3.

A main intake duct 60 guides intake air via the turbocharger compressor 44 and the cooler 17 towards the inlet duct 6 of each of the cylinders 31 to 36. Exhaust gas leaving the cylinders 31 to 36 via each of the corresponding exhaust ducts 7 is channelled via the main exhaust duct 70 to the turbine 45 which drives the compressor 44. Downstream the turbine 45, the main exhaust duct 70 may optionally be provided with a nitrogen oxide sensor (or NOx sensor) 18 configured to measure the engine-out NOx gas concentration supplied through the main exhaust duct 70. Typically, the NOx sensor is located upstream of an SCR catalyst (not shown) and arranged to directly measure the engine-out NOx gas concentration. Besides that the NOx sensor may be used to measure NOx (NO and NO2) content in the exhaust, it is generally also used to measure the oxygen level in the exhaust. In this manner, the NOx sensor is configured to measure the oxygen fraction in the exhaust gases.

Generally, although strictly not required, the air path circuit of the ICE system is defined at least partly by the main intake duct 60, main exhaust duct 70 in combination with the inlet ducts 6, the exhaust ducts 7, including but not limited to the interior volumes of the cylinders 31 to 36 and the turbocharger arrangement 23.

FIG. 3 also indicates that the ICE 12 comprises a control unit 80 configured to control operation of the powertrain system 10, the internal combustion engine system 11 and the internal combustion engine 12, including e.g. controlling the fuel supply system 32 (FIG. 2), the inlet and exhaust valves 3, 4 (by controlling the valve actuation arrangement 15a, 15b) and optionally the NOx sensor 18, so as to gather relevant data from the powertrain system. Further, in line with conventional ICEs, the control unit 80 is configured to control various other components of the ICE 12 and to receive various input signals from sensors of various kinds.

Figure 4:
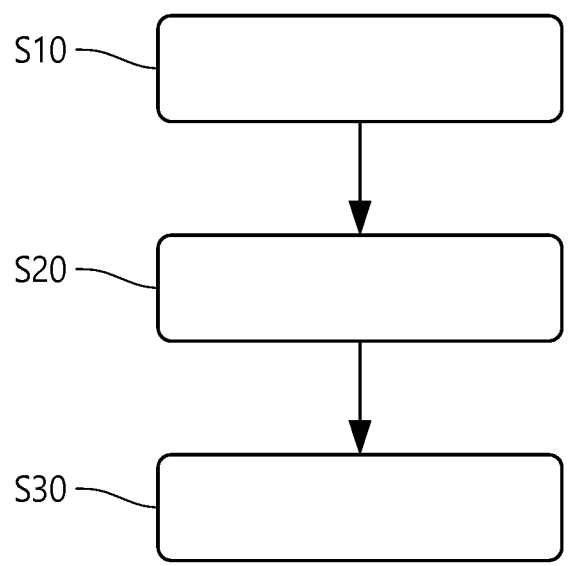
FIG. 4 shows an example flow-chart of a method according to the disclosure.

Turning now to FIG. 4, there is depicted a flow-chart of a method according to example embodiments of the disclosure. The method is intended for diagnosing a part of a powertrain system 10 as described above in relation to FIGS. 1 and 2. By way of example, the part of the powertrain system may refer to the turbocharger arrangement 23. In other examples, the method may be performed for diagnosing another part of the powertrain system, such as the oxygen fraction determined by the NOx sensor 18. The sequences of the method are typically performed by the control unit 80, as described above in relation to the FIGS. 1 and 2. Thus, while referring to FIG. 4, a number of steps for diagnosing a part of the powertrain system in FIG. 3 will now be described.

The method comprises at the least the following steps:
  operating S10 any one of the inlet valve and the exhaust valve for any one of the cylinders to adjust the frequency and/or duration of air pulses during different load conditions of the internal combustion engine;
  determining S20 an operational behaviour of the part of the powertrain system in response to the adjusted frequency and/or duration of the air pulses; and comparing S30 the determined current operational behaviour of the part of the powertrain system with an expected behaviour of the part of the powertrain system.

In this context, the term load conditions typically refers to engine speeds and/or engine torque.

Adjusting the frequency and/or duration of air pulses during different load conditions of the internal combustion engine can be performed in several different manners by the VVA system, including the valve actuation arrangement 15a and 15b and the inlet and exhaust valves 3 and 4. By way of example, the inlet valve 3 and the exhaust valve 4 of one cylinder 31 are controlled to add additional air pulses into the air path system of the ICE system. In addition, or alternatively, the inlet valve 3 and the exhaust valve 4 of one cylinder 31 are controlled to adjust the extension of the current air pulses being supplied to the air path system of the ICE system. However, in some example embodiments, it may only be necessary to adjust the frequency and/or duration of one exhaust valve 4, i.e. the openness frequency and/or openness duration of the exhaust valve 4. In other example embodiments, it may only be necessary to adjust the frequency and/or duration of one inlet valve 3, i.e. the openness frequency and/or openness duration of the inlet valve 3.

After some time, perhaps within some seconds, step S10 is generally interrupted and steps S20 and S30 are initiated.

Optionally, step S30 comprises the step of determining if the determined operational behaviour differs from the expected operational behaviour by a threshold value indicative of a critical deviation in the operational behaviour. Such threshold value is generally stored in the control unit 80.

If the method is used for diagnosing the turbocharger arrangement 23, the following steps and sub-steps are generally performed:

determining an operational behaviour of the turbocharger arrangement in response to the adjusted frequency and/or duration of the air pulses by determining the turbo speed of the turbocharger arrangement in response to the adjusted frequency and/or duration of the air pulses; and comparing the determined operational behaviour of the turbocharger arrangement with an expected behaviour of the turbocharger arrangement by comparing the determined turbo speed of the turbocharger with an expected turbo speed of the turbocharger.

By way of example, the step of comparing the determined operational behaviour of turbocharger arrangement with an expected behaviour of the turbocharger arrangement is performed by gathering turbo speed data collected after the frequency and/or duration of the air pulses has been adjusted and comparing such turbo speed data to turbo speed data collected before the frequency and/or duration of the air pulses is adjusted.

By way of example, the control unit 80 is arranged to detect an impact of a change in air pulses on the turbocharger turbine by means of a sensor (not shown) or the like. In this manner, the control unit 80 may be arranged to collect data from the sensor and determine the turbo speed (i.e. an operational response) of the turbocharger turbine as a result of the added air pulses, based on the collected data.

In other words, at least one sensor (not shown) may be used to detect impact of the adjusted frequency and/or duration of air pulses on the turbocharger, e.g. by detecting impact on injected pressurized gas on the turbocharger turbine and to collect data related thereto. The data collected is subsequently evaluated by the control unit 80, whereby an operational response of the turbocharger turbine can be determined, such as the turbo speed of the turbocharger. The operational response may e.g. be that the turbocharger is affected or not is affected by the injected pulse and/or may relate to the degree of response of the turbocharger turbine. It is possible to measure impact on the turbocharger turbine at various positions of the turbocharger system or at various positions being fluidly connected to the turbocharger turbine of the engine. Thus, it is not necessary that the data collected for evaluating the response of the turbocharger turbine is derived from a sensor which directly detects e.g. movements of the turbocharger turbine, such as e.g. a turbo speed sensor. The data may also be derived from a sensor which is configured to collect data for a parameter that indirectly affects or is affected by movement of the turbocharger turbine, such as e.g. a boost pressure sensor or a mass flow sensor. Such indirect sensor data may be correlated to the turbocharger turbine response by means of previously performed mapping or predetermined threshold values. Such correlation may e.g. be performed by the control unit 80.

If the powertrain system comprises the NOx sensor, and the method is used for diagnosing oxygen fraction, the following additional steps and sub-step are generally performed.

determining an operational behaviour of the part of the powertrain system in response to the adjusted frequency and/or duration of the air pulses by determining the oxygen fraction in the exhaust gases by the NOx sensor in response to the adjusted frequency and/or duration of the air pulses; and comparing the determined current operational behaviour of the part of the powertrain system with an expected behaviour of the part of the powertrain system by comparing the determined oxygen fraction with an expected oxygen fraction.

Analogously to the example with the turbocharger, the step of comparing the determined oxygen fraction with an expected oxygen fraction may be performed by gathering oxygen fraction data collected after the frequency and/or duration of the air pulses has been adjusted and comparing such oxygen fraction data to oxygen data collected before the frequency and/or duration of the air pulses is adjusted.

While the method may be used for diagnosing several different parts of the powertrain system, the method may typically include an optional step of selecting a part of the powertrain system to be diagnosed. The selection of the part of the powertrain system to be diagnosed is typically performed by the control unit 80.

As mentioned above, there are many ways of controlling inlet and exhaust valves in order to adjust the frequency and/or duration of air pulses, e.g. by adjusting the valve lift and/or the timing of the valve opening or closing for the purpose of regulating the mass flow rate of air. Generally, an additional amount of gas/air should be allowed to pass the cylinder than during normal valve lift and valve timing. In one example, only the inlet valve lift is adjusted compared to normal operation of the engine. In another example, the timing of only the opening of the inlet valve 3 is adjusted so that an additional amount of gas/air enters the cylinder 31 compared to normal operation. In other examples only the lift or timing of the exhaust valve 4 is adjusted, respectively.

The method may be executed as an on-board diagnostics routine by the control unit. In addition, or alternatively, the method may be executed remote of the vehicle by a remote-control unit.

Although FIG. 4 shows a specific order of the method steps, the order of the steps may differ from what is depicted, and various method steps may be performed simultaneously or partially simultaneously.

It is to be understood that the present disclosure is not limited to the embodiments described above and illustrated in the drawings; rather, the skilled person will recognize that many changes and modifications may be made within the scope of the appended claims. Thus, variations to the disclosed embodiments can be understood and effected by the skilled addressee in practicing the claimed disclosure, from a study of the drawings, the disclosure, and the appended claims.

The invention claimed is:

1. A method for diagnosing a part of a powertrain system, said powertrain system comprising an internal combustion engine system having an internal combustion engine being a cam-less internal combustion engine provided with a plurality of cylinders, each cylinder being provided with an air inlet valve and an exhaust gas valve, said internal engine combustion system further comprising a fully variable valve actuation (VVA) system with individual valve actuation, said fully VVA system having a respective valve actuation arrangement for the air inlet valve and for the exhaust gas valve, said internal combustion engine system further comprising a control unit configured to control the valve actuation arrangement to operate the air inlet valve and the valve actuation arrangement to operate the exhaust gas valve, the method being executed as an on-board diagnostics routine by the control unit, and the method comprising the steps of:
introducing disturbance injections in the form of air pulses into an air-path system by operating any one of the air inlet valve and the exhaust gas valve for any one of the cylinders to adjust a frequency and/or duration of air pulses during different load conditions of the internal combustion engine to add additional air pulses in the air path system of the powertrain system in addition to prevailing air pulses which are supplied in the air path system of the powertrain system for each respective load condition, wherein the frequency and/or duration of the air pulses is controlled by means of the fully VVA system;
determining an operational behavior of the part of the powertrain system in response to the adjusted frequency and/or duration of the air pulses; and
comparing the determined operational behavior of the part of the powertrain system with an expected behavior of the part of the powertrain system.

2. The method according to claim 1, further comprising the step of determining if the determined operational behavior differs from the expected operational behavior by a threshold value indicative of a critical deviation in the operational behavior.

3. The method according to claim 1, wherein the powertrain system further comprises a turbocharger arrangement having a turbine for receiving exhaust gases from the internal combustion engine and a compressor for compressing intake air and feeding said intake air via an air intake line to said internal combustion engine, said turbine being configured to convert exhaust gases into mechanical energy to drive the compressor, and wherein:
the step of determining the operational behavior of the part of the powertrain system in response to the adjusted frequency and/or duration of the air pulses is determining a turbo speed of the turbocharger arrangement in response to the adjusted frequency and/or duration of the air pulses; and
the step of comparing the determined operational behavior of the part of the powertrain system with the expected behavior of the part of the powertrain system is comparing the determined turbo speed of the turbocharger arrangement with an expected turbo speed of the turbocharger arrangement.

4. The method according to claim 1, wherein the powertrain system further comprises a NOx sensor disposed in an exhaust passage downstream the internal combustion engine, and wherein
the step of determining an operational behavior of the part of the powertrain system in response to the adjusted frequency and/or duration of the air pulses is determining the oxygen fraction in the exhaust gases by the NOx sensor in response to the adjusted frequency and/or duration of the air pulses; and
the step of comparing the determined operational behavior of the part of the powertrain system with the expected behavior of the part of the powertrain system is comparing the determined oxygen fraction with an expected oxygen fraction.

5. The method according to claim 1, further comprising the step of selecting the part of the powertrain system to be diagnosed.

6. The method according to claim 1, wherein the step of comparing the determined operational behavior of the part of the powertrain system with the expected behavior of the part of the powertrain system is performed by gathering operational data collected after the frequency and/or duration of the air pulses has been adjusted and comparing said operational data collected after the frequency and/or duration of air pulses has been adjusted to operational data collected before the frequency and/or duration of the air pulses is adjusted.

7. A control unit for controlling a powertrain system, characterized in that the control unit is configured to perform the steps of the method according to claim 1.

8. A vehicle comprising a powertrain system and the control unit according to claim 7.

9. A non-transitory computer readable medium carrying a computer program comprising a program for performing the steps of claim 1 when said program is run on a computer.

* * * * *